(No Model.) 8 Sheets—Sheet 1.
C. H. SALZMAN.
CORN HARVESTER.

No. 441,809. Patented Dec. 2, 1890.

Witnesses:
Albert H. Adams.
Harry T. Jones.

Inventor:
Christian H. Salzman (No Model.) 8 Sheets—Sheet 5.
C. H. SALZMAN.
CORN HARVESTER.
No. 441,809. Patented Dec. 2, 1890.
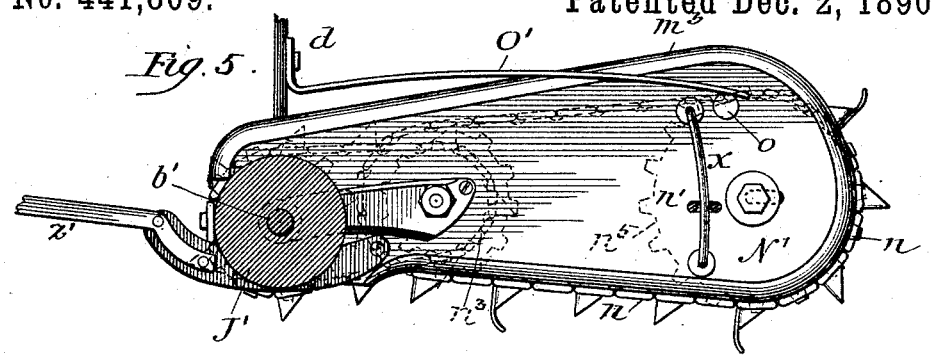
Fig. 5.
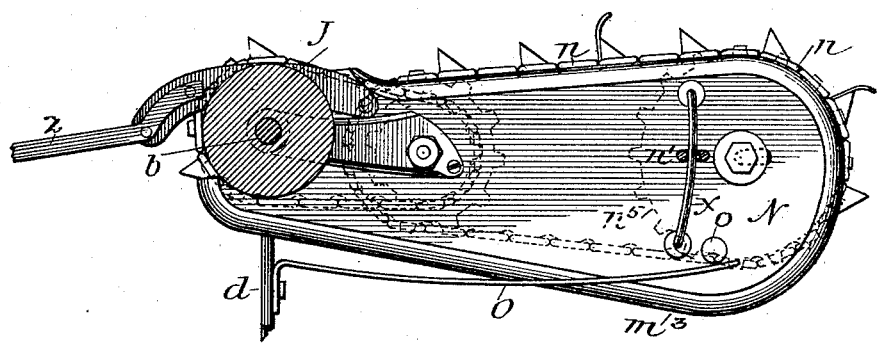
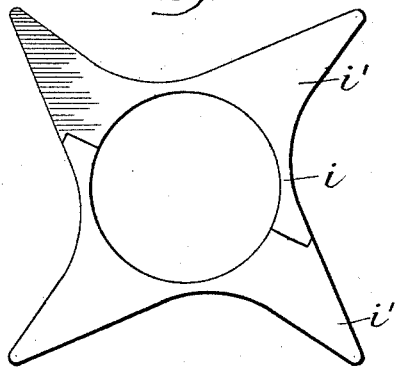
Fig. 6.
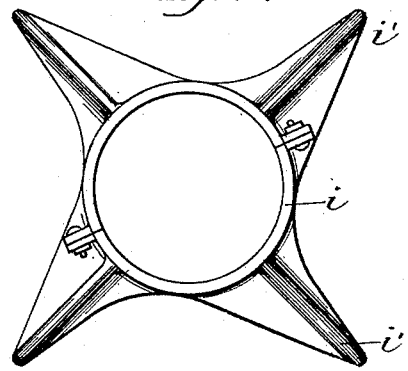
Fig. 7.
Witnesses:
Albert H. Adams
Harry T. Jones
Inventor:
Christian H. Salzman
THE NORRIS PETERS CO., PHOTO-LITHO., WASHINGTON, D. C.

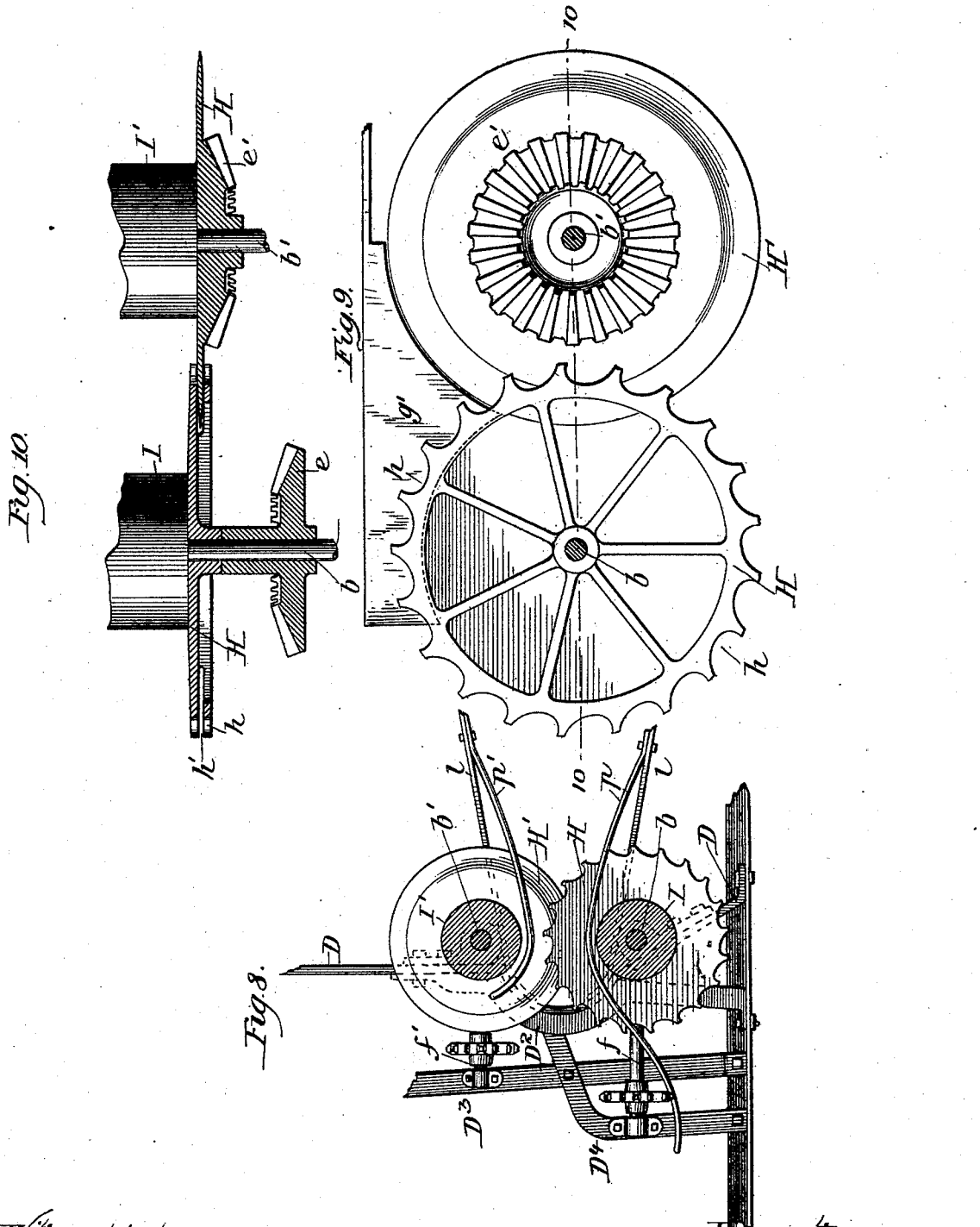

(No Model.) 8 Sheets—Sheet 7.
C. H. SALZMAN.
CORN HARVESTER.
No. 441,809. Patented Dec. 2, 1890.
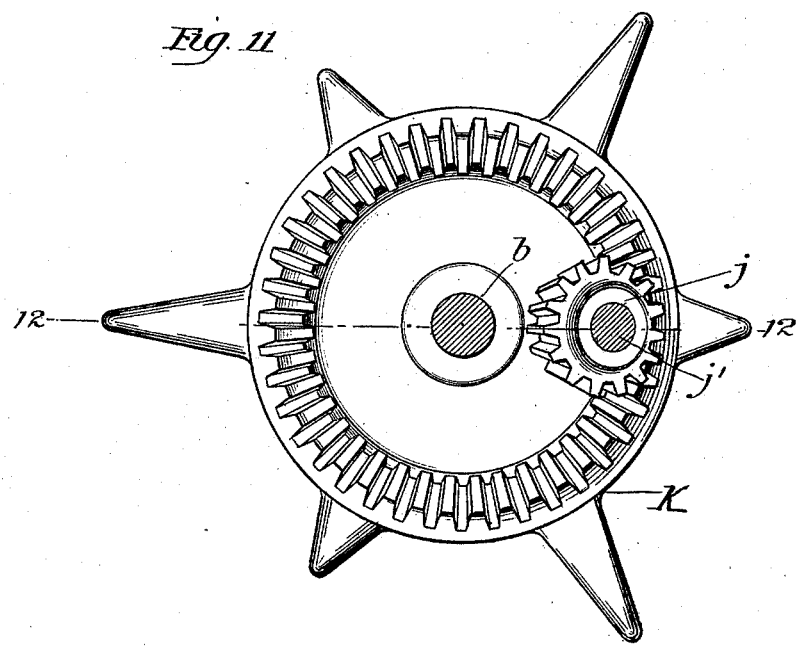
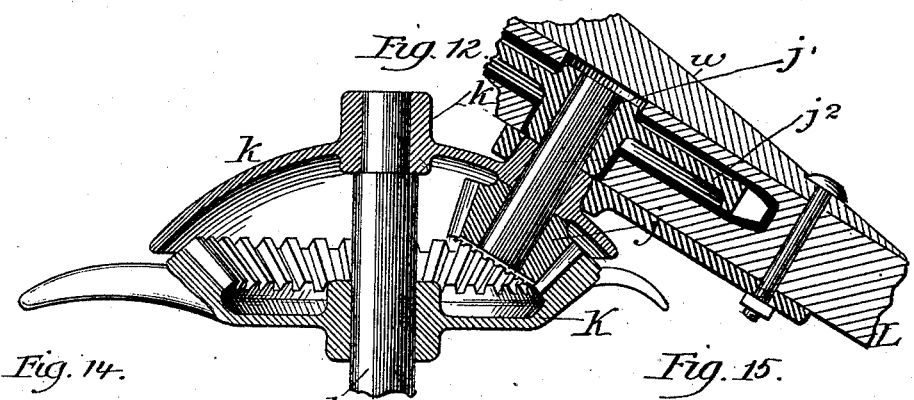
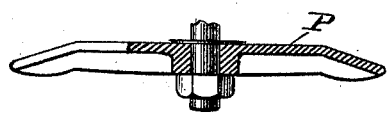
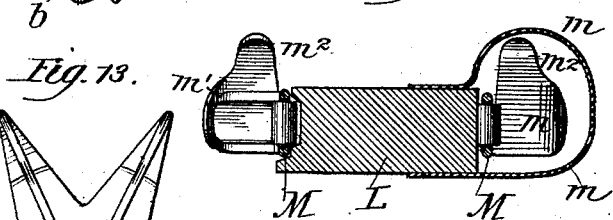
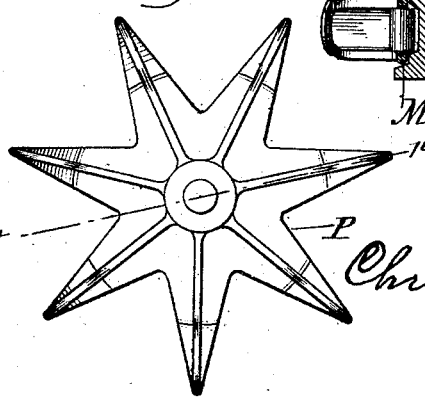
Witnesses:
Albert H. Adams
Harry F. Jones
Inventor:
Christian H. Salzman

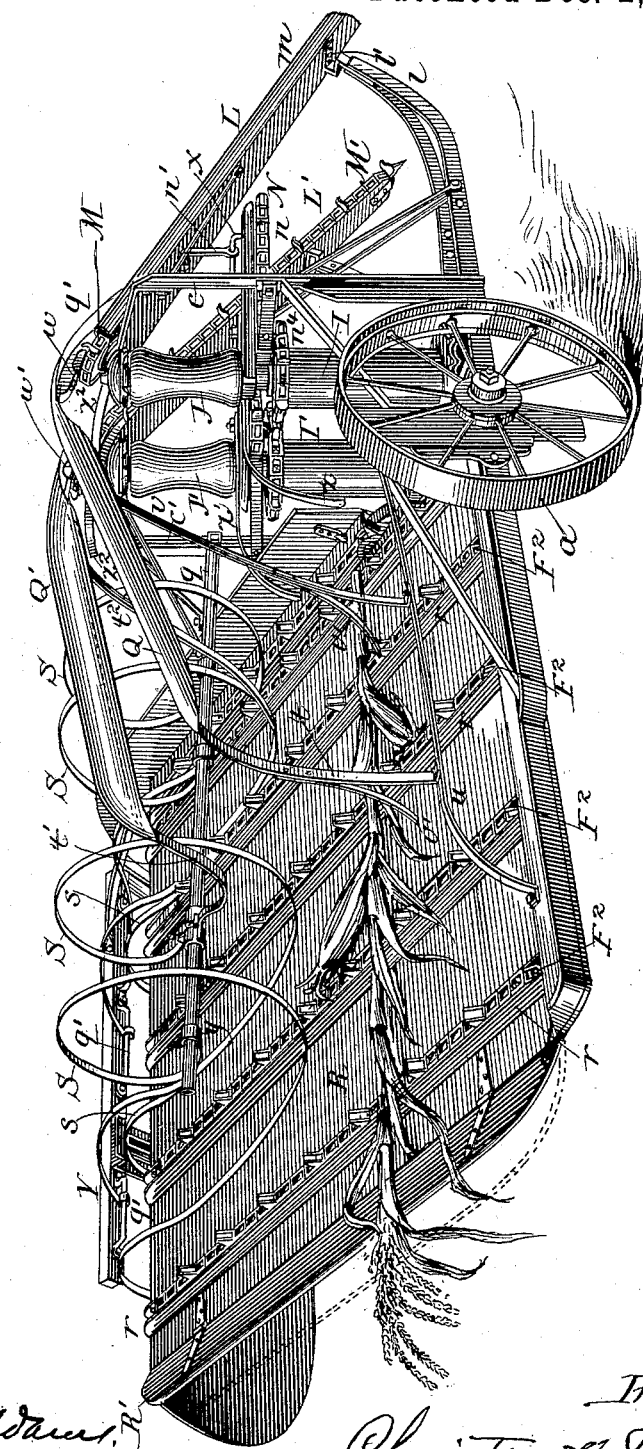

UNITED STATES PATENT OFFICE.

CHRISTIAN H. SALZMAN, OF CHICAGO, ILLINOIS, ASSIGNOR TO THE D. M. OSBORNE & COMPANY, OF AUBURN, NEW YORK.

CORN-HARVESTER.

SPECIFICATION forming part of Letters Patent No. 441,809, dated December 2, 1890.

Application filed November 9, 1889. Serial No. 329,830. (No model.)

*To all whom it may concern:*

Be it known that I, CHRISTIAN H. SALZMAN, residing at Chicago, in the county of Cook and State of Illinois, and a citizen of the United States, have invented certain new and useful Improvements in Corn-Harvesters, of which the following is a specification, reference being had to the accompanying drawings, in which—

Figure 1:
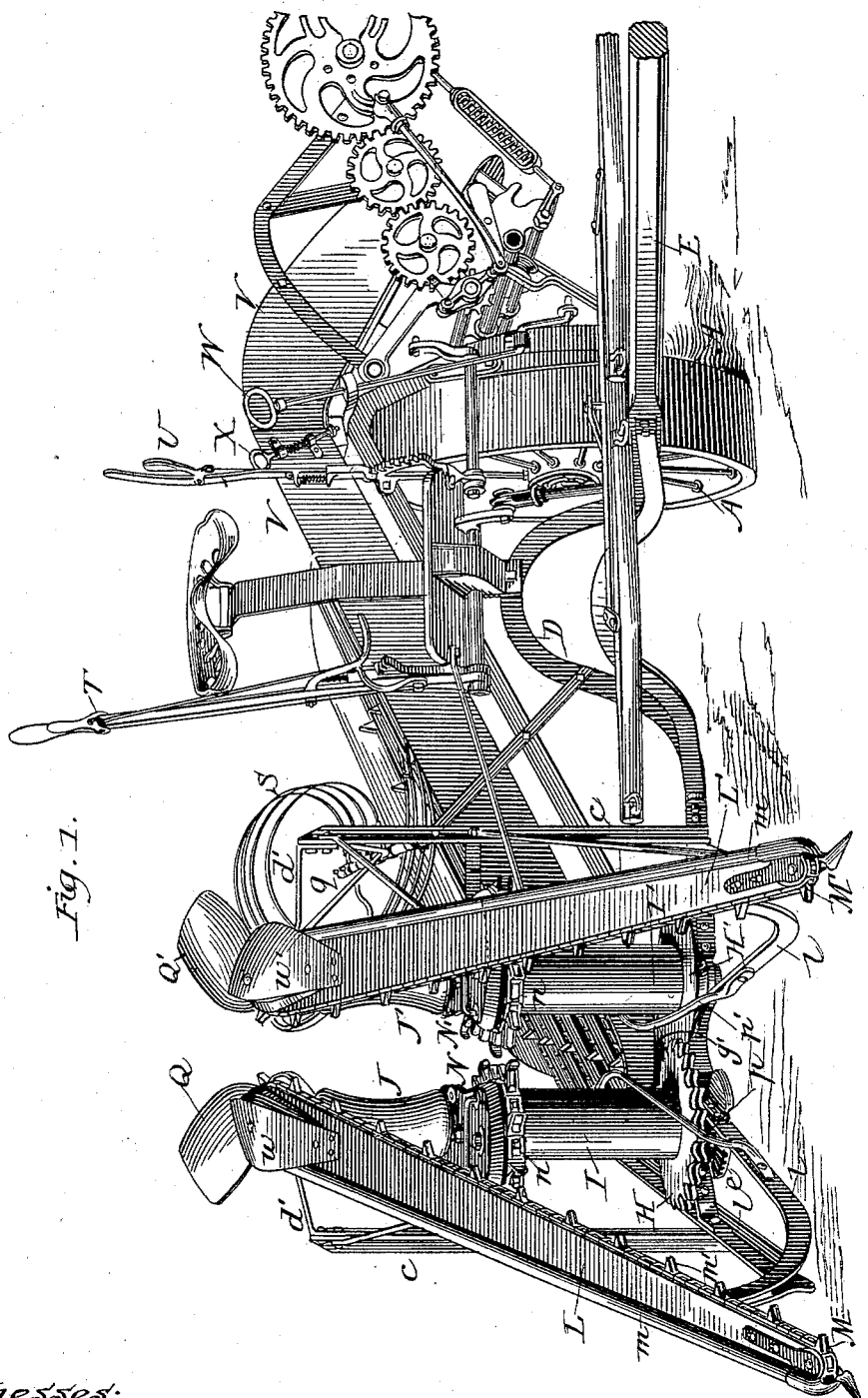
Figure 2:
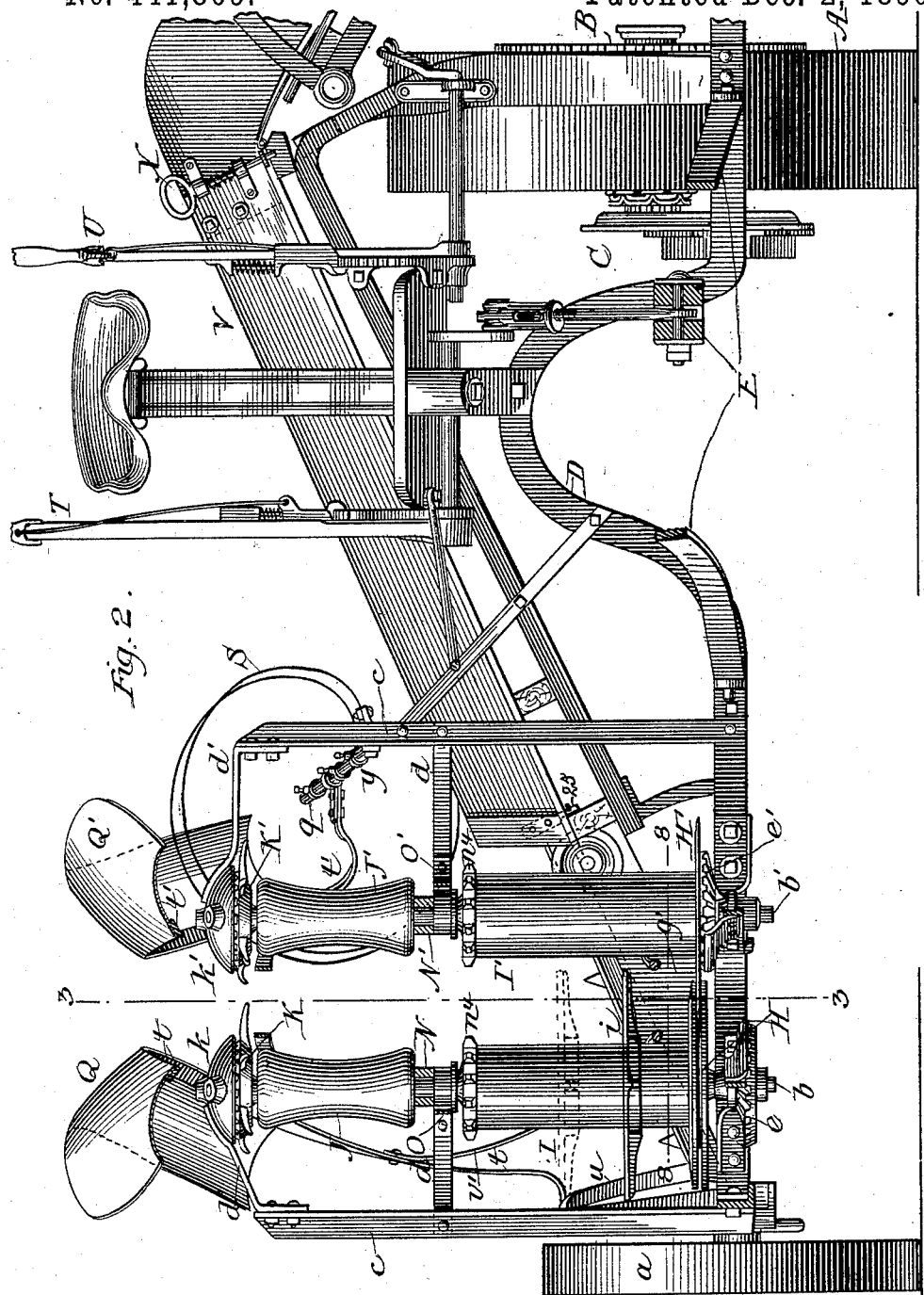
Figure 3:
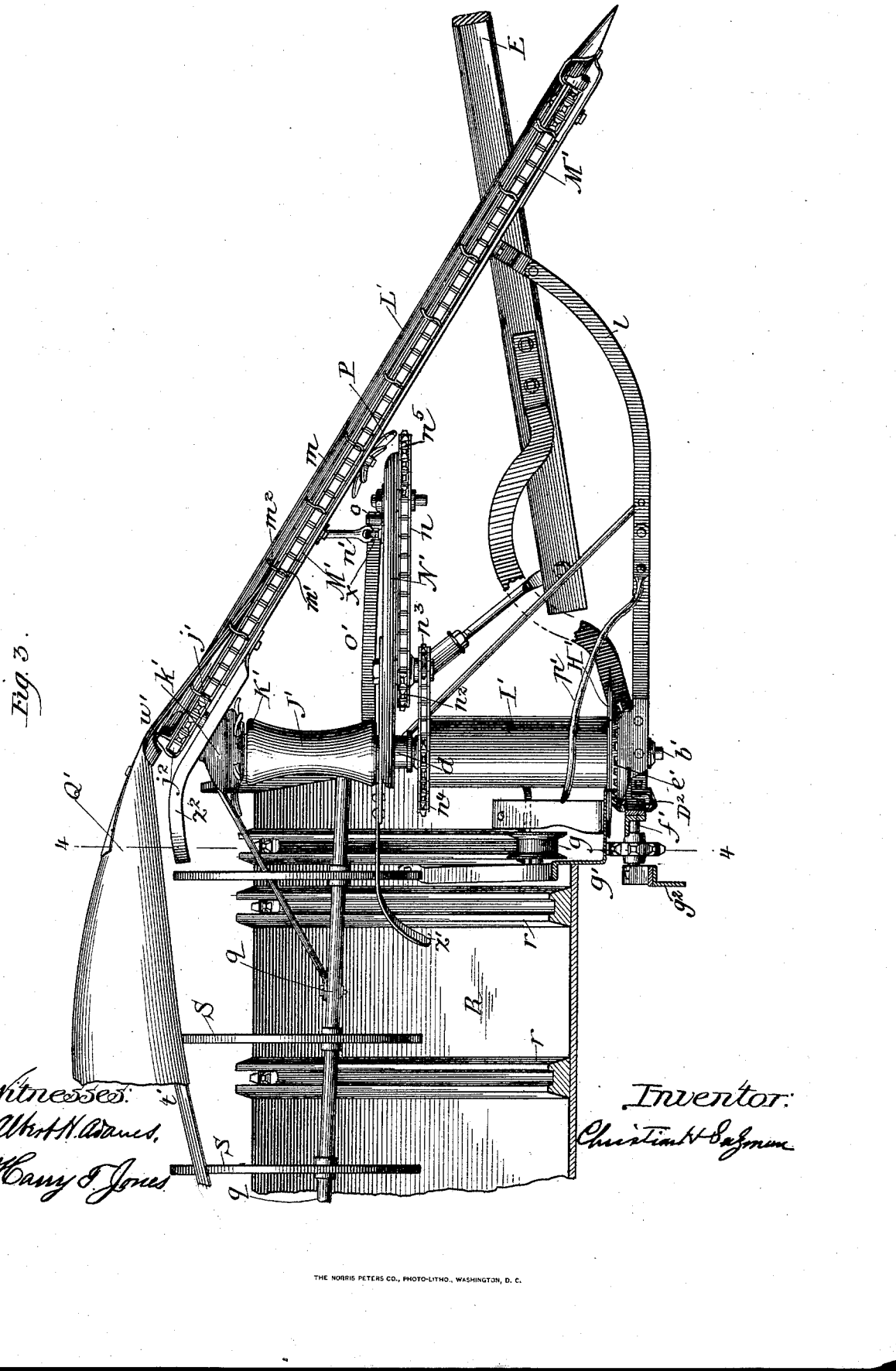
Figure 4:
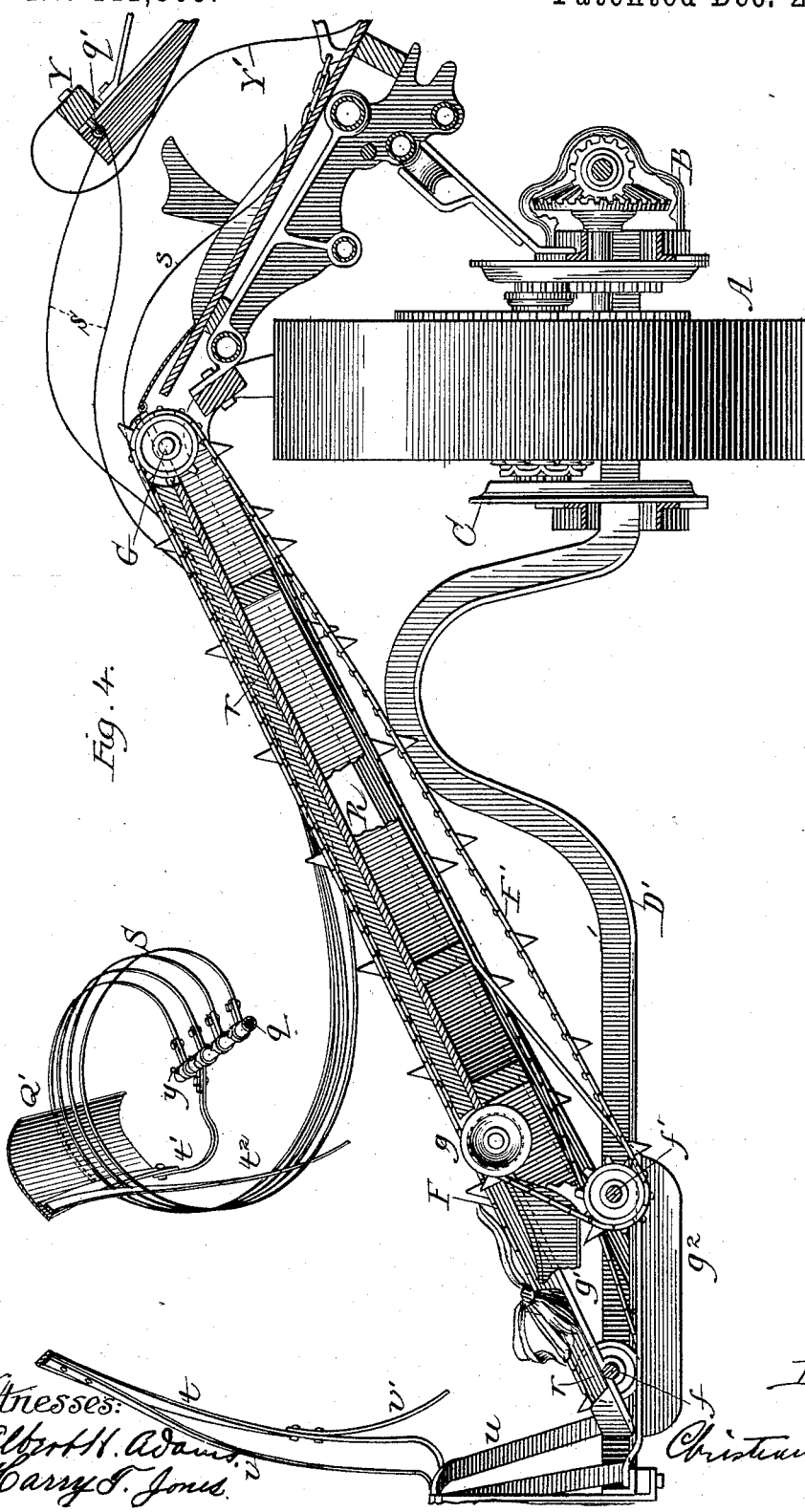

Figure 1 is a perspective view showing the forward part of the harvester. Fig. 2 is a front elevation of the parts shown, some of the parts being in section. Fig. 3 is a vertical section taken at line 3 3 of Fig. 2. Fig. 4 is a cross vertical section at line 4 4 of Fig. 3. Fig. 5 is an enlarged detail, being a top view of the swinging frames. Figs. 6 and 7 are enlarged details, being top and bottom views of the adjustable toothed collar. Fig. 8 is an enlarged detail, being a horizontal section at line 8 8 of Fig. 2, showing the cutting device. Fig. 9 is an enlarged detail, being an under side view of the cutting device. Fig. 10 is a vertical section at line 10 10 of Fig. 9, showing the cylinders in elevation. Fig. 11 is an enlarged detail showing a top view of a driving-wheel on the top of one of the vertical shafts. Fig. 12 is a vertical section at line 12 12 of Fig. 11, together with a section of the gathering-arm, the sprocket-wheel, shaft, &c., which drive the chain on the gathering-arm. Fig. 13 is an enlarged detail showing a star-wheel. Fig. 14 is a section at line 14 14 of Fig. 13. Fig. 15 is an enlarged cross-section through one of the gathering-arms. Fig. 16 is a perspective view of the rear part of the harvester.

This invention relates to corn-harvesters.

The object of my invention is to construct a harvester for cutting corn and binding the stalks in well-shaped bundles, which I accomplish as illustrated in the drawings and as hereinafter described.

That which I claim as new will be pointed out in the claims.

In the drawings, A represents the driving-wheel. Suitable gearing B is connected with the driving-wheel A for driving the several mechanisms of the harvester, and suitable raising and lowering devices C are provided on its inner side for raising and lowering the frame of the harvester on this wheel A, as shown in Fig. 4. These devices are not particularly shown or described, as any of the common forms or constructions may be used, and they form no part of my invention.

D D' are lower cross-pieces at the front and rear, respectively, of the frame of the harvester. These cross-pieces are made of steel or other suitable material, and are arched, as shown in Figs. 1, 2, and 4, so that the arches will straddle a row of standing corn without injuriously breaking down the stalks when opening or commencing to cut a field of corn.

E is a tongue, which is forked or split, as shown in Figs. 1 and 2, so that it can be attached to each side of the arch of the front frame-piece D, and one part of the brace or tongue may be arched, so that it will not interfere with or break down the corn, while permitting a horse to pass on each side of a row of corn; but I do not limit the use of my other improvements to a machine having an arched bed-frame or arched brace.

$a$ represents a carrying-wheel on the opposite side of the harvester from the driving-wheel A, as shown in Fig. 2. The frame of the harvester is also adjustable vertically on the wheel $a$.

$b\ b'$ are two vertical shafts, which are supported in suitable bearings at their lower ends on the front frame-piece, and at their upper ends are held in their vertical positions by uprights $c$, which are braced by and securely supported from the frame of the harvester. These uprights are connected with the upper and middle bearings of the shafts $b\ b'$ by brackets $d\ d'$, as shown in Fig. 2.

$e\ e'$ are gear wheels on the lower ends of the shafts $b\ b'$, respectively, which are driven by pinions, one of which is shown in Fig. 3 on shafts $f\ f'$, respectively, (see Fig. 8,) which shafts $f\ f'$ are provided with sprocket-wheels, which are driven by drive-chains F F', respectively, which chains are driven by sprocket-wheels on a shaft G, as shown in Fig. 4. The shaft G may be driven from the driving-wheel A by any suitable gearing.

In order to adapt the disk H to operate as a feed-wheel as well as a part of the cutting apparatus, it is necessary that the "notches," as I have termed them, should be hook-shaped, as shown in Figs. 6 and 7, or of such form as to partly embrace the stalk or stalks carried in to be severed. The chains F F' also serve as elevating-chains, as hereinafter described, an idler wheel or pulley g being provided for the chain F' to raise it into proper position, as shown in Fig. 4.

H is a feeding-disk wheel, and H' is a rotating-disk cutter, which are keyed onto the shafts $b$ $b'$, respectively, and form the cutting apparatus of the harvester. It is not absolutely necessary, however, that the cutter H' be keyed to its shaft $b'$, as it may be loose thereon and be rotated by the action of the feeding-wheel during the operation of cutting. The periphery of the disk or cutter H' is sharpened to form a cutting or knife edge.

The periphery of the feeding-wheel H is provided with notches $h$, each adapted to receive a large single stalk of corn and feed it in against the cutter H', as shown in Figs. 8 and 9. The wheel H has a groove $h'$ in its periphery, as shown in Fig. 10, into which the cutter H' extends. As the stalks are caught by the notches $h$ of the feeding-wheel H, they are fed against the cutter above and below and cut off. The cutter H' extends into the groove in the feeding-wheel H sufficiently far to completely sever the stalks in the notches $h$ and be supported therein, so as to prevent its being bent or twisted. The under side of the feeding-disk wheel H is provided with strengthening-ribs, which support an under rim, which is provided with notches corresponding in size and position with the upper ones $h$. These ribs are grooved out at their ends as deep as the width of the rim or slightly deeper, thus forming a practically open-bottomed groove, which prevents any filling up of the groove or clogging of the cutting apparatus. By "open-bottomed groove" I mean a groove having its rear under side open. The wheel H is made in disk form, as well as the cutter H', so that the butts of the cut stalks will not be caught thereon.

The shafts $b$ $b'$, on which the feeding-wheel H and cutter H' are respectively keyed, are driven by separate and independent means from the same shaft G, so that the rotation of each is independent of the other.

I I' are feeding-cylinders secured on the shafts $b$ $b'$, respectively, above the cutting apparatus. On the cylinder I is clamped a collar $i$, which may be adjusted vertically on said cylinder. This collar is provided with teeth or prongs $i'$, which engage with the stalks of corn and force them backwardly. This collar, as shown, is provided with four prongs $i'$; but a different number may be provided, if desired. It is made adjustable vertically, so that it may be adjusted, as necessary, in cutting short or high corn; but its principal use is in separating and disposing of such weeds as may be cut with the corn.

J J' are auxiliary feeding-cylinders secured on the shafts $b$ $b'$, respectively, above the cylinders I I', as shown in Figs. 1, 2, 3, and 16. They are of a smaller diameter at their middle portions, so as to provide a space for the passage of the corn-ears.

K K' are wheels, which are provided with arms, and are secured on the shafts $b$ $b'$, respectively, at their upper ends. As shown in Figs. 2 and 11, the arms or spurs of these wheels are alternately longer or shorter and extend out a sufficient distance to engage with and advance the tops of the stalks. The long arm of one wheel is arranged to co-operate with the short arm of the other wheel.

The upper face of each wheel K K' is provided with bevel-gear, as shown in Figs. 11 and 12, with which engage bevel-pinions $j$ for driving the sprocket-wheels $j^2$, both secured on the short shafts $j'$, which are mounted in bearings in caps $k$ $k'$. The caps $k$ $k'$ are provided with bearings for the shafts $b$ $b'$, respectively, and they are supported by the rods or brackets $d'$ of the standards $c$. The caps $k$ $k'$ also act as shields to protect the gearing on the wheels K K'.

L L' are gathering-arms, which at their upper or rear ends are secured to the caps $k$ $k'$, respectively, by means of hubs and collars, so that they can be turned, as shown at Fig. 12, and at their lower ends are supported upon bracing-arms $l$, which extend forwardly from the lower part of the frame of the harvester, as shown in Figs. 1, 3, and 16. The arms L L' at their forward ends are held at such a distance apart that the stalks of a single row can be conveniently gathered between them, and they converge at their rear end, so as to bring the tops of the stalks together above the cutting apparatus, as shown in Fig. 1. The arms L L' are each adjustably connected with the bracing-arms $l$ by the adjusting-holes $l'$, as shown in Fig. 16, so that they may be held farther apart or closer together at their forward ends, as may be found desirable. These arms are wide enough to support an ear of corn upon their surfaces, and I prefer to taper them toward their front ends, as shown.

M M' are endless chains, which are placed on the edges of the gathering-arms L L', respectively, and are provided with lugs formed as shown in Fig. 15, which engage with leaning stalks of corn. These lugs are attached to every fourth link, more or less, and are made to project into the gathering-space by the projections $m'$ and above the gathering-arm by the projection $m^2$, (see Figs. 1, 3, and 15,) which raises up and carries backwardly the leaning stalks of corn. For best results the chains are geared so as to give them a speed equal to three times (more or less) the advance movement of the harvester. The inner edges of the gathering-arms are grooved or provided with ledges or supports to prevent the chains from sagging, and the projections $m'$ $m^2$ are inclined somewhat backward in relation to the direction of travel, so as to release themselves with more freedom from the stalks at the upper sprocket turn.

Each chain M M' at its upper end runs over a sprocket-wheel $j^2$ on the shaft or journal $j'$ and at its lower end over a sprocket-wheel or loose pulley, which may be supported in an adjustable bearing, as shown in Fig. 1, near the end of the gathering-arm. The outer edge of each of the arms L L' is provided with a covering $m$ for the chain, as shown in Figs. 1 and 3 and in section in Fig. 15, for preventing the return of the chain from catching any bent stalks or ears of corn which may hang over the outer edge of the arm, and thereby be liable to be broken off by the descending chain. This covering $m$ is continuous, and, being rounded, eases the drawing in of the overhanging ears, and as it projects upward or above the gathering-arm it tends to incline the overriding ears inwardly, and it also aids in delivering the ears over the shield $w$ $w'$ to the guides Q Q'.

N N' are swinging bars or frames, which at their rear ends are respectively supported on the shafts $b$ $b'$ and middle bearings or brackets $d$ above the cylinders I I', as shown in Figs. 1, 2, 3, and 5. These frames extend forward in a horizontal position nearly to the arms L L', and they are made broad at their forward ends to prevent stalks from getting between them and the bars L L', and they are supported by links or straps $n'$, fastened or hinged to the arms L L', respectively, and bail-rods $x$, passing through eyes at their lower ends, as shown in Figs. 3 and 16. These bars or frames N N' are also provided with rearward extensions or guides $z$ $z'$, which vibrate with the frames and guide the severed and falling stalks. These frames N N' are provided with chains $n$, having lugs or projections to catch the stalks and carry them backwardly. These chains are driven each by a sprocket-wheel $n^2$, which is mounted on a journal driven by sprocket-wheels $n^3$ $n^4$ and a chain, as shown in Fig. 3. The forward end of the chain $n$ passes around the sprocket-wheel $n^5$, and the outside of the chain $n$ is covered with a guard or shield $m^3$, which may be an extension of the upper side of the frame over the chain.

O O' are springs, which at their rear ends are attached to the brackets or arms $d$, and at their forward ends each presses against a pin $o$ on the frames N N', respectively, as shown at Figs. 3 and 5, and press the forward or free ends of the swinging frames N N' inwardly or toward each other, and the bars or frames are provided with suitable limit-stops to prevent them from coming in contact. These stops may be formed by arranging the bends in the bails $x$, Fig. 16, so as to come in contact with the hangers $n'$, or sufficient stops may be formed by adjusting the guides $z$ $z'$ to come in contact with fixed braces or parts of the frame.

The stalks of corn which do not stand erect are raised by the chains M M' on the gathering-arms L L' as the harvester advances and are brought nearer together. They are then caught by the chains $n$ and carried between the swinging frames N N', which press the tops together, and the chains $n$ being driven at twice the speed of the advancing movement of the machine the tops of the stalks are bent or curved backward, so that when they are cut off by the cutting apparatus they invariably fall backwardly. The springs O O' press the frames N N', respectively, toward each other, so that their chains will press against the stalks sufficiently to keep the lugs in engagement with the stalks, and they also yield sufficiently to allow the entrance of several stalks at the same time, yielding according to the desired capacity. The limit-stops prevent the chains from coming in contact, and the projections on the chains are so arranged as not to come opposite to each other.

A star-wheel P, which is located so as to extend inwardly beyond the lugs on the chains M M', is loosely mounted on a journal secured to the under side of each of the arms L L' in such position in relation to the outer ends of the frames N N' that the stalks which are carried up by the chains M M' will be caught by the star-wheel and be freed from the ears or lugs of the chains M or M' at the time they are caught by the lugs on the chains $n$, thereby preventing the stalks from being caught by both chains at the same time or held between the chain M or M' and the chains $n$ of either frame N or N'. The star-wheels are provided with a web, which may extend beyond the line of the projections on chains M M', and their inclined position in relation to the frames N N' will aid in discharging the stalks from the chains M M'. The star-wheels also prevent stalks from getting between the bars or frames N N' and L L', and they also furnish an under support for the chains M M' to prevent their being drawn from their grooves, and thus avoid their entanglement with the chains $n$.

The spurred wheels K K' engage with the stalks when or before they are cut and carry them backwardly, so that they will fall on the table, as hereinafter described.

Two guides $p$ $p'$ are secured at their forward ends to the braces $l$ and extend backward between the cylinders I I', as shown in Figs. 1 and 8, for preventing the stalks, leaves, or weeds from engaging with the cylinders I I' and winding thereon. They also serve to bring the stalks together, so that they will be properly guided to the cutting apparatus. The guide $p$ is made longer than the guide $p'$ for the purpose of holding the cut crop from being carried around by the revolution of the feeding-wheel and acts as a support for the lower end of the stalks until they are landed on the elevator.

The arms L L' are provided with spring-fenders $z^2$, as shown in Figs. 3 and 16, which cause the tops of the stalks to pass from these arms onto the guides Q Q' without becoming entangled with the moving parts there located.

Q Q' are guides or shields, which at their forward ends are secured to the caps k k', respectively, by means of the shields w w' and rest upon the rods or bars t t'. They extend rearwardly and downwardly, as shown in Fig. 16, so that the stalks after being cut off will fall between them onto the elevating-frame at or nearly at a right angle to the carriers.

The bar or support t is attached to the shield Q at its forward end, and, as shown at Fig. 16, its rear end is curved downward and rests upon a bar u; but it may be carried farther downward and attached to the bed-frame, as may also the support v. These supporting-bars t v are provided with guides or springs v', which prevent the stalks from falling too far down on the elevator or at a bad angle for delivery to the binder.

The bar t' has its rear end so curved as to be attached to the rod or arm q, and if a brace or support corresponding to the support v is used it will be similarly attached to the rod q. The bar t' is provided with a guide-bar or spring t², as shown in Fig. 4. The bars t t' may be so formed as to dispense with or take the place of the guiding-shields Q Q'; but these shields give a freer movement to the stalks in falling and prevent the liability of catching or breaking the ears or the stalks or of holding them up.

The inclined table or elevating-frame R, onto which the stalks fall, extends upwardly, as shown in Fig. 4, forming the support for the elevating-chains F F' F², which elevate the stalks and deliver them to the binder. This table or frame R is provided with guides or supports r for the elevating-chains, which supports r raise the chains a short distance above the frame or table to avoid unnecessary friction and to prevent the ears of corn from lifting the stalks out of engagement with the elevator-teeth. The chains F² are driven by sprocket-wheels on the shaft G the same as the chains F F', and at their lower ends they run over loose pulleys. (Not shown.)

The cut stalks are carried upward by the ears or lugs on the chains F F' F² as they fall thereon. In order to hold the stalks down or on the chains, I provide springs S, which are secured at one end on the rod or shaft q and describe a circle or scroll therefrom, as shown in Fig. 4. They are attached to the rod by collars and set-screws y, so that their pressure can be adjusted. They extend upwardly toward the binder, and are so formed that they will press downward upon the elevating-frame, and, with the exception of the rear spring S, which is unattached or directly attached to the bar Y, they are secured at their upper ends to a rod or loop-bar q' on the bar Y. These springs, being secured at both ends, give an even pressure on the stalks, and the elevating-chains are not affected by the jolting of the machine. By adjusting the collars y on the shaft or rod q the pressure of the springs on the table or frame R and the spaces between the several springs may be adjusted or varied as may be necessary. These springs, or some of them, are provided with spring branches s, which extend downwardly over the binder-table, as shown in Fig. 4, so as to press upon the stalks until they are delivered to the binder.

Y' is a spring for the binder, and may or may not be used.

To the rear end of the frame R is hinged a board R', as shown in Fig. 16, which may be turned up on its hinges, so as to raise the tops of the stalks sufficiently to take their weight from the chains at the rear, thereby giving long stalks a support at such a distance from their butts that the portion extending beyond the table will not tend to overbalance or swing the butt-ends up from the front chains. When cutting short corn, the board R' may be turned down in the position shown by dotted lines in Fig. 16. The board or leaf R' will be sustained in its horizontal position by the abutting of the inner edge of said leaf against the adjacent edge of the platform, and a hook may be provided at one end to support it in an elevated position.

The raised supports r are grooved at the top, so as to properly support and guide the elevating-chains, and their ends project over the upper edge of the inclined platform or elevator R sufficiently far to clear the chain teeth or lugs from the stalks at the point of discharge, as shown at Fig. 3.

As the elevator-platform R is inclined from its lower side limit, it passes the line of cut at a point considerably higher than the plane of the cutting, as shown by the cut stalk in Fig. 4. This height above the plane of the cutting is desirable for locating the driving-gear and for permitting the cutting and feeding disks to pass beneath it. I cut away a portion of the elevator-frame and set in an angular plate g', as shown in Figs. 1, 2, and 3. This plate g' has a horizontal flange, which, as shown in Fig. 9, projects forward into the grooved periphery of the feed-wheel and fits against the cutter, or may extend over the cutter, as shown in Fig. 3. The horizontal part of the plate g' prevents the stalks from dropping down after they are severed, and as the stalks are moved backward by the arms i' of the collar i they are tripped over its vertical portion and raised so as to fall clear of the cutting apparatus when on the elevator.

A descending guard-plate g² (shown at Fig. 4) is provided in front of the drive-chain F to prevent it from being crowded back by the corn-stubble so as to unslip it from its lower sprocket-wheel.

The shafts f f', for driving the shafts b b', are supported by and journaled on the bars or angle-irons D², D³, and D⁴, as shown at Fig. 8. The boxes on D² are not shown. Figs. 6 and 7 show a convenient mode of constructing the collar *i*.

The hand-lever T is used for tilting the machine; but as the axes of the driving and carrying wheels are so near the front of the machine the tilting has no appreciable effect on the cutting apparatus, and its main utility consists in elevating or depressing the forward ends of the gathering-bars L L', so that the points may be made to run in close contact with the ground when the corn is badly down or high when it stands up. The lever U is used for shifting the binder backward or forward to adjust it in position. The lever W is used for throwing the machine into or out of gear, and the spring-bolt X is used for adjusting the rear end of the butting-board V backward or forward, so as to properly and evenly deliver the stalks to the binder, said butting-board V being hinged or pivoted, as shown at 25 in Fig. 2. The cornstalks after being elevated are delivered to a binder to be bound in bundles of suitable size. The binder may be an enlarged Appleby binder or any one of the various well-known forms of grain-binders which are adapted to bind grain. The binder shown is shown and described in Letters Patent No. 367,852, issued to me August 9, 1887.

In operation the harvester is driven across the field, cutting at a time a single row of corn, as ordinarily planted, either in check-rows or drills. The arms L L' gather the leaning or fallen stalks and raise them, so that their tops will be properly carried backward by the chains to the swinging frames N N', and, together with the strongest stalks, be by the chains *n* carried to and between the cylinders, where they are cut and thrown or caused to fall on the elevating-frame R, on which they are elevated to the binder, their fall being guided as hereinbefore set forth. The feeding-wheel H feeds only one large stalk or two or more small ones at a time against the cutter H', which rotates and severs the stalks with a small amount of resistance or expenditure of power. The speed of the feeding-wheel H is sufficient to feed the stalks as rapidly as they are reached by the harvester without clogging, and all stalks which are cut will be carried back far enough to be out of the way of succeeding stalks, and the guards *p p'* prevent them from being carried around too far and prevent any cut weeds or leaves from being wound on the cylinders I I'. The arch of the frame-pieces D D' is at such a distance from the cutting device that in cutting one row of corn, as in opening a field, the row of standing corn over which the harvester passes will be beneath the arch and not be broken down to an injurious extent.

The cutting apparatus made as shown and described is the best known to me; but it is evident that the projections on the under rim of the disk H, which form notches corresponding to the upper ones, may be omitted, and by beveling the cutter H' from the under side, so as to bring the edge at its upper surface, the under rim or plate of the disk H may be dispensed with entirely, and when the disks are strongly supported in position an inferior but operative cutting apparatus will be produced, as the upper notches of the feed-wheel will take hold of and force the stalks backward, as hereinbefore described.

What I claim as new, and desire to secure by Letters Patent, is—

1. In a corn-harvester, the supporting cross-pieces D D', having arches therein located in position to clear the row of stalks adjacent to the row acted on by the cutter, substantially as specified.

2. In a corn-harvester, the combination, with the supporting cross-piece D, having an arch therein located in position to clear the row of stalks adjacent to the row acted on by the cutter, of a forked tongue having an arched brace, substantially as and for the purpose specified.

3. In a cutting apparatus having a circular cutter, a driven revolving peripherally-notched wheel having hook-shaped holding-notches, whereby said wheel operates as a feed-wheel in carrying stalks to position for cutting and in severing them, substantially as described.

4. In a corn-harvester, the combination, with a circular cutter H', of a notched feeding-wheel H, having an open-bottomed groove *h'* in its periphery to receive the cutter, substantially as and for the purpose specified.

5. In a corn-harvester, the combination, with a circular cutter H', of a notched feeding-wheel H, having an open-bottomed groove *h'* in its periphery, said wheel being open or provided with a notched rim and supporting-ribs on its under side, substantially as and for the purpose specified.

6. In a corn-harvester, the combination, with the arms L L', of chains M M', having inward projections *m'* and upward projections $m^2$, for gathering inclined or fallen stalks, substantially as specified.

7. In a corn-harvester, the combination, with the inclined gathering-arms, of frames N N', swinging horizontally in rear of said arms, substantially as and for the purpose specified.

8. In a corn-harvester, the combination, with a gathering-arm L and a frame swinging horizontally in rear thereof, of a star-wheel secured on said arm at a point opposite or nearly opposite the forward end of the frame N and having its arms or points extending into the stalk-passage, substantially as and for the purpose specified.

9. In a corn-harvester, the combination, with gathering-arms L L' and frames N N', swinging horizontally in rear thereof, of springs O O', pressing the frames N N' toward each other and automatically varying the space between said frames, substantially as and for the purpose specified.

10. In a corn-harvester, the combination of gathering-arms, frames swinging horizontally in rear thereof, springs O O', pressing the frames toward each other and automatically varying the space between said frames, and guides z z', extending rearwardly from said frames, substantially as and for the purpose specified.

11. In a corn-harvester, the combination, with the bed-frame of the harvester, of vertical shafts b b', uprights c, brackets d', caps k k', gathering-arms L L', supported on said caps, and braces l, substantially as specified.

12. In a corn-harvester, the combination, with a circular rotating cutter and a rotating feed-wheel, of the two elevator-chains F F' and gearing for positively driving the cutter and the feed-wheel, respectively, from the separate elevator-chains, substantially as specified.

13. In a corn-harvester, the combination, with the cutting apparatus composed of the feeding-wheel and circular cutter, and the cylinders I I', located above the cutting apparatus, of the guides p p', extended backward between said cylinders, substantially as and for the purpose specified.

14. In a corn-harvester, the combination of the gathering-arms L L', the endless chains M M', moving in opposite directions on the opposite sides of said arms, the vertical shafts b b', the feed-disk H and circular cutter H', mounted on the lower ends of said shafts, the gear-wheels K on the upper portions of said shafts, the caps k, attached to the upper end of the arms L L' at the tops of the shafts, the pinions j, and the shafts j', having sprocket-wheels for the endless chains, substantially as shown and described.

15. In a corn-harvester, the combination, with the elevating-frame and carrier, of the laterally-adjustable curved springs S, located above the carrier, said springs being secured at both ends to give an even pressure on the stalks and having at one end an adjustable connection to vary their tension on the carrier, substantially as shown and described.

16. In a corn-harvester, the combination, with the elevating-frame and carrier, of the springs S, located above the carrier and attached at both ends and having free-ended branch springs s attached thereto and extending over the binder-table, substantially as and for the purpose specified.

17. In a corn-harvester, the combination of an inclined receiving-platform, the elevating-chains, a cutting apparatus arranged across the line of travel in front of the lower part of said platform, the receiving-plate g' between said cutting apparatus and platform to support the butts of the cut stalks, and the armed collar i, supported above and adjacent to the cutters to force the stalk-butts back while supported in a vertical position on the receiving-plate, substantially as described.

18. In a corn-harvester, the combination, with the platform R, a cutting apparatus in front of said platform, and the gathering-arms L L', of the broad curved shields Q Q', supported by the upper ends of said arms above the cutting apparatus and extended rearwardly and downwardly over the platform, and the supports t t' for guiding the tops of the falling stalks, substantially as shown and described.

19. In a corn-harvester, the combination, with the shield Q and support t, of the yielding guide v', projecting downwardly and inwardly from the support t, substantially as and for the purpose specified.

20. In a corn-harvester, the combination, with the cutter and the gathering-arms L L', of the swinging frames N N', having guides z z', substantially as and for the purpose specified.

21. In a corn-harvester, the combination of the inclined gathering-arms L L', having toothed chains, and the horizontal swinging frames N N', having toothed chains, with the star-wheel P, having arms projecting into the stalk-passage, substantially as and for the purpose described.

22. In a corn-harvester, the combination of the inclined gathering-arms L L', having toothed chains, and the horizontally-swinging frames N N', having toothed chains, with the cylinders I J I' J' and the rotary cutting apparatus, substantially as and for the purpose specified.

23. In a corn-harvester, the combination of the inclined gathering-arms L L', having chains M M', the horizontally-swinging bars or frames N N', chains n, and cylinders I I' J J', with the cutting apparatus, guides for the falling stalks, and an elevator, substantially as and for the purpose specified.

24. In a corn-harvester, the forwardly and downwardly projecting gathering-arm L and a chain-guard m on the outer edge thereof, projecting above the plane of the arm, in combination with a gathering-chain having upward and outward projections passing downward through said guard and upward on the inner side of the arm, substantially as and for the purpose specified.

CHRISTIAN H. SALZMAN.

Witnesses:
HARRY T. JONES,
ALBERT H. ADAMS.